April 29, 1958 E. M. BARBER 2,832,324
INERTIA SUPERCHARGING OF INTERNAL COMBUSTION ENGINE
OPERATING AT HIGH SPEED AND WITH HIGH
RATE OF AIR SWIRL
Filed May 31, 1955 4 Sheets-Sheet 1

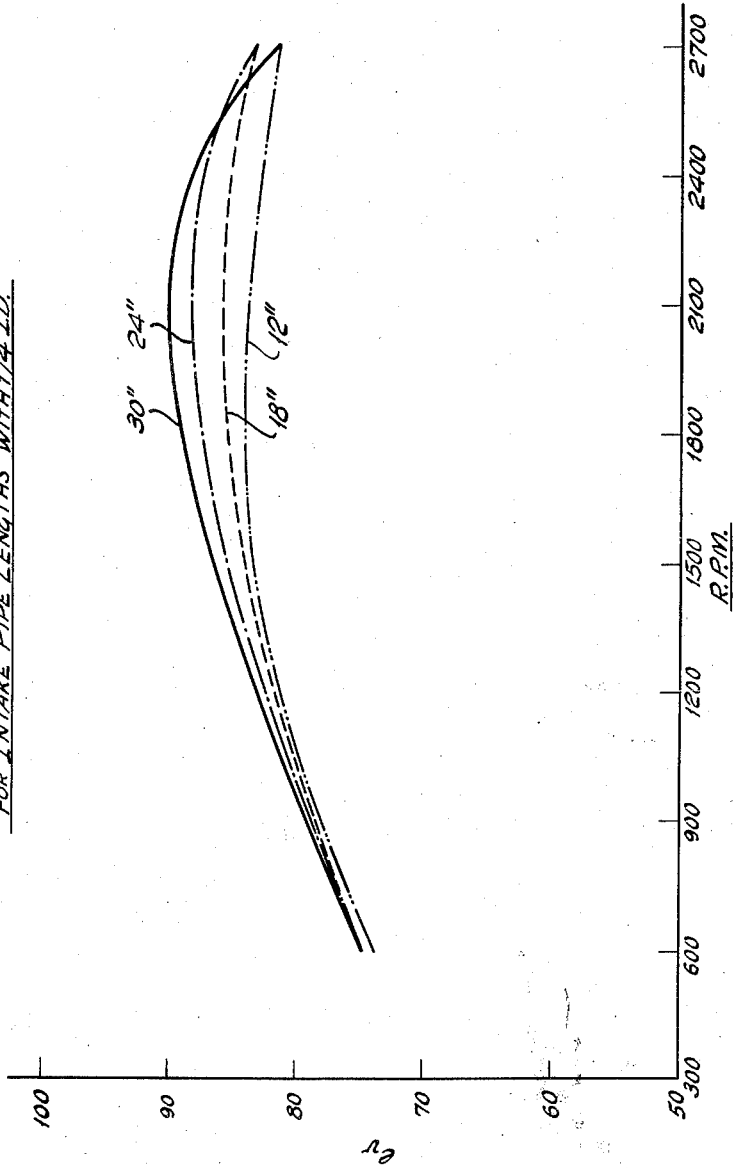

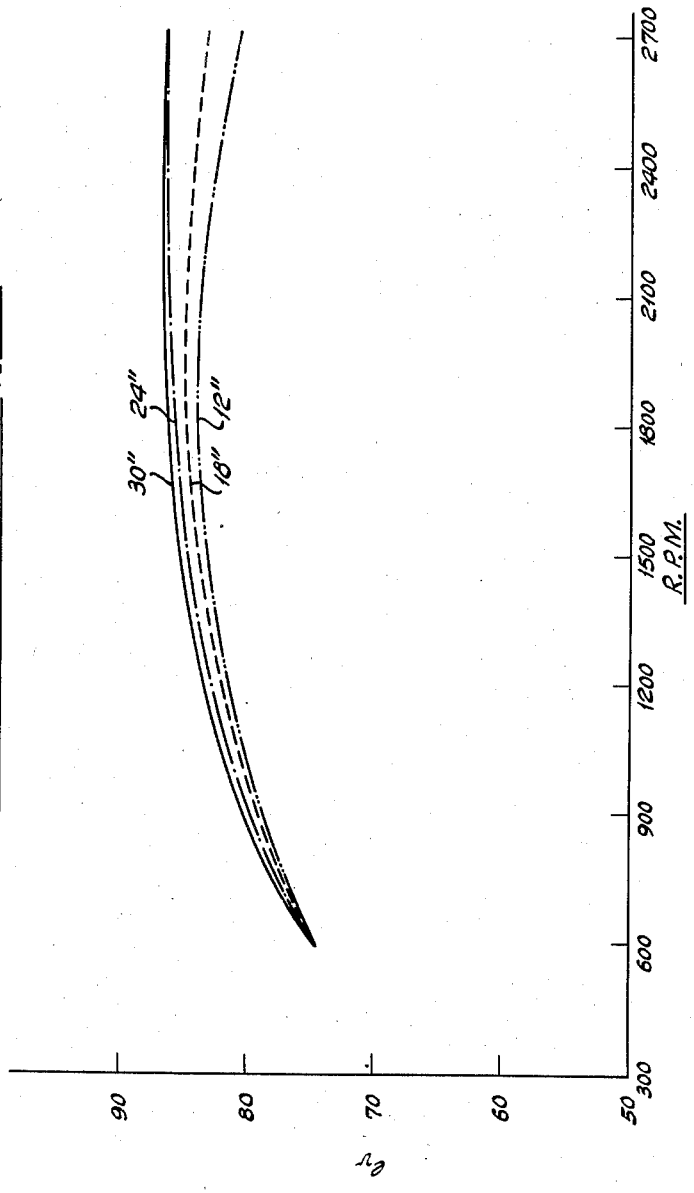

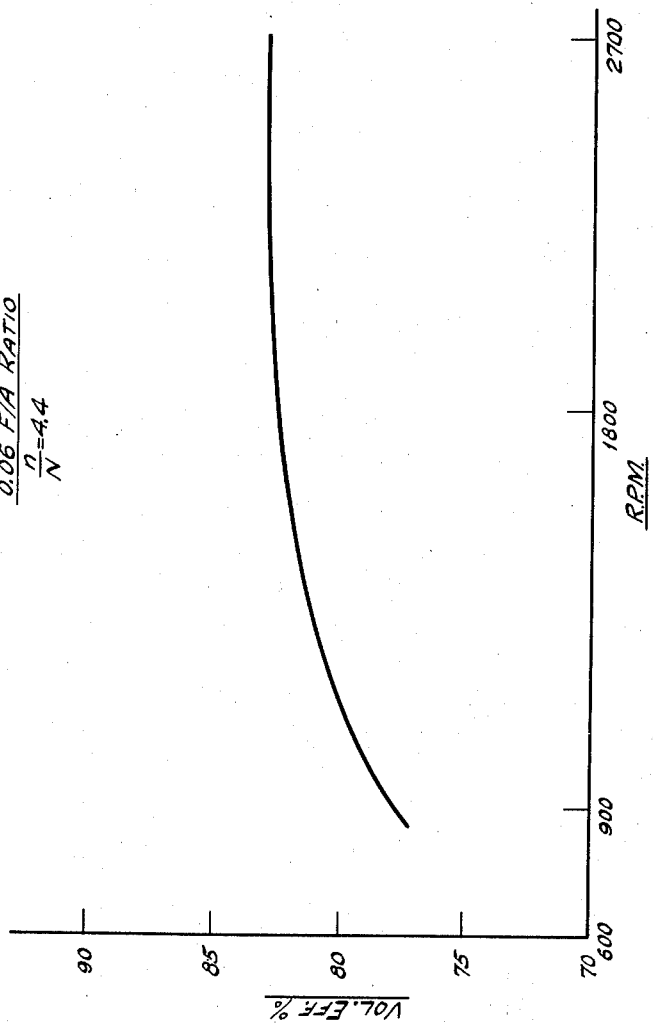

United States Patent Office 2,832,324
Patented Apr. 29, 1958

2,832,324

INERTIA SUPERCHARGING OF INTERNAL COMBUSTION ENGINE OPERATING AT HIGH SPEED AND WITH HIGH RATE OF AIR SWIRL

Everett M. Barber, Wappingers Falls, N. Y., assignor to The Texas Company, New York, N. Y., a corporation of Delaware Application May 31, 1955, Serial No. 511,890

4 Claims. (Cl. 123—32)

The present invention relates generally to high speed operation of a reciprocating piston, internal combustion engine wherein a high rate of rotation or swirling movement is imparted to the inducted air charge within the engine combustion chamber, and combustion is of the non-knocking type as disclosed in my U. S. Patent No. 2,484,009. Specifically, the present invention relates to an improved air intake system for such an engine.

To impart a high rate of rotation to the inducted air charge in a reciprocating piston, internal combustion engine at high engine speeds and volumetric efficiency for good horsepower output is a difficult problem. One way of imparting rotation to or producing a swirl in the inducted air charge is to provide a shroud on the inlet valve, in order to deflect the inducted air charge in the direction desired, so that, in cooperation with the combustion chamber wall, the air charge may be caused to swirl in a generally circular path around the combustion chamber while being drawn in during the suction stroke of the piston. Another way in which rotative or swirling motion of the inducted air charge may be obtained is by drawing the air into the combustion chamber through a tangentially oriented and inclined inlet port structure.

Using either a shrouded valve or a tangentially oriented and inclined inlet port structure reduces the effective area of the air inlet and results in a loss in volumetric efficiency at high engine speeds when a high rate of air swirl is sought. This loss in volumetric efficiency proportionally reduces the available power output of the engine, for in going to high-speed engine operation, certain factors arise causing the increased volumertic efficiency to fall off sharply.

The loss in volumetric efficiency associated with the above methods of creating air swirl while operating at high engine speeds can be made up by supercharging to raise the pressure of the external air being supplied to the engine and thus force a greater mass of air into the combustion chamber during each intake stroke. However, it is well recognized in the art that the usual types of superchargers are expensive, are not economically feasible for conventional engine operation, and are restricted in application to specialized installations. The present invention provides an improved air intake system which is uncomplicated and economical yet affords a practical solution to the problem of sustaining a high level of volumetric efficiency at high engine speeds while imparting a high rate of swirl to the inducted air charge.

An object of the present invention is to produce an internal combustion engine of the reciprocating piston type, operating with a high rate of swirl of the inducted air charge and having an improved volumetric efficiency.

Another object of invention is to provide an internal combustion engine operating with a high rate swirl of the inducted air charge and having an improved volumetric efficiency over a wide range of high-speed operation.

Still another object of invention is to provide an internal combustion engine operating at high engine speeds and air swirl wherein the inducted air charge is drawn into the combustion chamber through an intake pipe of controlled length and diameter.

A further object of invention is to provide an improved method and apparatus, which is both simple and inexpensive, for supercharging the air charge drawn into a high speed, internal combustion engine of the reciprocating piston type operating with a high rate of air swirl.

These and other objects and advantages of the invention will be apparent from the following description taken in connection with the accompanying drawings wherein:

Fig. 3 is a graph showing the variations in volumetric efficiency with variations in the intake pipe lengths;

Fig. 4 is a graph similar to Fig. 3 and illustrating the effect on volumetric efficiency of the use of an intake pipe with larger cross section; and Fig. 5 is a volumetric efficiency curve for the most favorable intake pipe dimensions found for a specific engine with specific operating conditions.

The present invention is concerned with an air intake system for use in the high speed operation of internal combustion engines having high air swirl rates which is characterized by an air intake passage for controlling inducted air flow therethrough having dimensions determined by certain engine design factors, while substantially avoiding the penalty of a reduction in volumetric efficiency at high engine speeds heretofore involved in such operation with air intake systems of the prior art, or optionally improved volumetric efficiency at low engine speeds.

Figure 1:
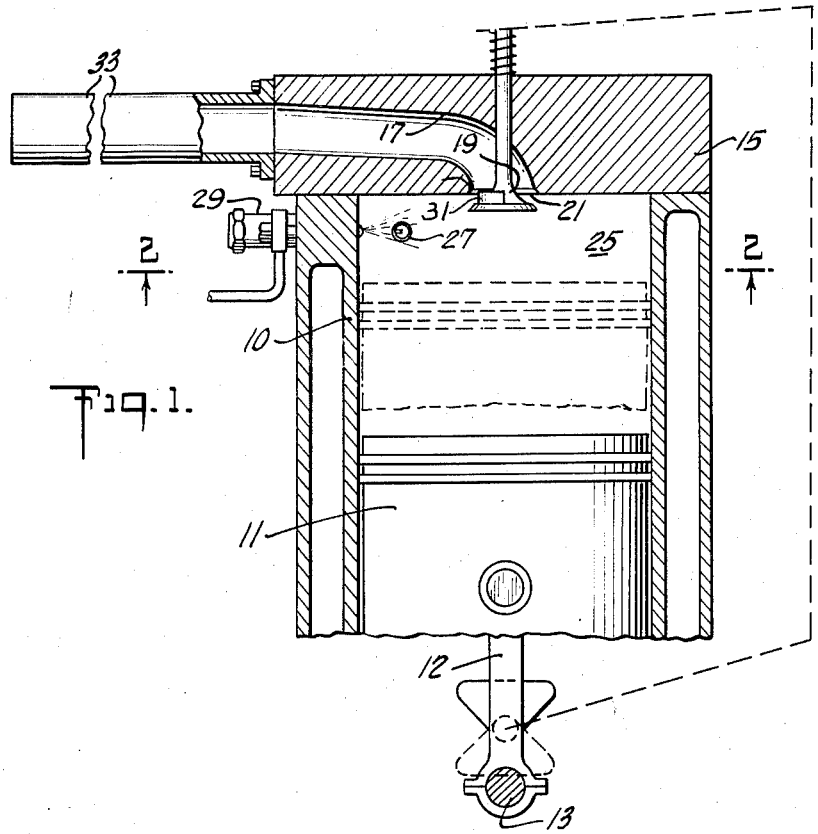
Fig. 1 is a vertical sectional view, looking in the direction of the arrows at 1—1 of Fig. 2, of an engine constructed in accordance with the present invention with part of the air intake system in cross section.
Figure 2:
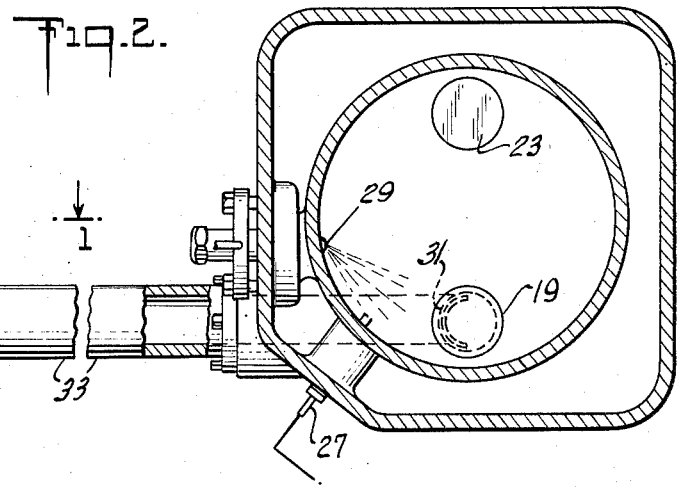
Fig. 2 is a horizontal sectional view of a portion of Fig. 1 taken along line 2—2 thereof.

An engine constructed in accordance with this invention is shown in Fig. 1 and includes a cylinder 10 with piston 11 and connecting rod 12, which runs to the crank shaft 13. The top end of the cylinder mounts a cylinder head 15 which is provided with an inlet port 17, closed by an inlet valve 19 at its orifice 21, and an exhaust port closed by an exhaust valve 23. Extending into the combustion chamber 25 formed between the cylinder head 15 and the piston 11 at the top end of the cylinder 10 is a spark plug 27, or other equivalent positive ignition means, and a fuel injection nozzle 29, both shown as projecting through the cylinder wall but which could be supported in the cylinder head 15 as well.

In a preferred embodiment capable of operating with non-knocking combustion in the manner described in my above noted U. S. patent, the nozzle 29 is mounted adjacent the periphery of the combustion chamber 25, downstream from the inlet port 17, in the direction of the swirling air movement, and is oriented so as to spray fuel generally down the air stream and chordwise less than a diameter of the combustion chamber 25. The spark plug 27 is spaced further downstream from the nozzle 29 a distance sufficient to permit the formation of combustible fuel-air mixture during the intervening travel of the fuel impregnated air, while at the same time being sufficiently close to the nozzle 29 to prevent the accumulation within the combustion space 25 of any substantial amount of combustible mixture prior to ignition. A preferred spacing of the spark plug 27 is such that combustion chamber radii passing through the centers of plug 27 and nozzle 29 respectively form an angle at the cylinder axis of from 30 to 45°, but this angle may vary from 0° to 120°. The inlet valve 19 is shown in exemplary form as of the poppet type, and is actuated from the engine, as shown diagrammatically.

To produce the necessary high-speed swirl of the induction air around the combustion chamber, the inlet valve 19 is equipped with a shroud 31, so positioned as to deflect the air inducted through the inlet port 17, and to direct it in a direction tangential to the combustion chamber 25.

In a preferred manner of operation of the above described engine with combustion of the type disclosed in my aforementioned patent, a high rate of swirl of the inducted air charge is employed, in conjunction with the spatially positioned fuel injection and timed ignition means, to achieve non-knocking combustion even at very high compression ratio. The injection of fuel is initiated into the rapidly swirling air charge about 75° to 20° prior to top dead center position of the piston compression stroke. The fuel is injected into a localized segment of compressed swirling air at one side of a diameter of its swirl path. The first increment of injected fuel is positively ignited less than 90° downstream from the locus of fuel injection and substantially as soon as a localized area or patch of combustible fuel-air mixture has formed therefrom to establish a flame front. Fuel injection is continued to impregnate progressively fresh increments of the swirling air as they move past the locus of fuel injection, thereby successively forming additional increments of combustible fuel-air mixture which are ignited by the flame front and burned substantially as rapidly as formed. Consequently, knocking of the engine cannot occur even at high compression ratios and high charge densities irrespective of the quality of fuel employed. Injection is continued long enough to impregnate the entire air charge. The time of initiation of the fuel injection and the rate and duration of injection are coordinated to provide the maximum pressure of the positively induced combustion closely adjacent and generally slightly after the top dead center position of the piston.

In such an engine operating in the aforesaid manner, impregnation of the air charge with an adequate amount of fuel to develop the power required, without incurring excessively rich fuel-air ratios in the successive increments of impregnated air, while at the same time keeping the duration of combustion within the limits necessary for thermal efficiency, requires a high rate of swirl or rotation of the air charge. Operation of such an engine at high-compression ratio without knocking and with good power output is dependent upon the achievement of air swirl at a rate such that the air charge rotates preferably about 6.0 times relative to the fuel injection source within the combustion chamber per crankshaft revolution.

To achieve this desired high rate of swirl of the inducted air, a substantial portion of the periphery of the inlet valve 19 is curtained by the shroud 31, thus considerably reducing the capacity of this valve i. e., the effective area of the orifice 21 closed by the valve 19 through which the inducted air can flow. Alternatively and/or in addition, the actual cross-sectional area of the inlet port 17 may be reduced to give the inlet air stream a higher velocity and thereby increase the air swirl rate.

As another alternative, the inlet port 17 may be oriented generally tangent and inclined to the combustion chamber 25, but this also reduces the effective area of the inlet port since for a given valve size, inclining the port 17 reduces its cross-sectional area. Thus, to obtain a selected high rate of rotation or swirl of the air charge, some reduction in the effective area of the inlet air passage or the outlet orifice thereof is required. This reduction in effective area of the passage through which the inducted air charge must flow is accompanied by a corresponding rapid drop off in the high speed volumetric efficiency of the engine, with a resultant decrease in maximum power output. In the case where maximum power output is of importance, these deficiencies can be minimized by the use of a supercharger, with an increase in the cost of construction.

The present invention arises from the discovery that there exists an effective and practical solution to the problem of high speed operation of an internal combustion engine with a substantial rate of air swirl and non-knocking combustion without incurring an excessive penalty in and even extending the volumetric efficiency thereof.

This involves the connection to the inlet port of a relatively smooth-wall air intake pipe 33, having a predetermined length and inside diameter correlated with the certain basic engine design factors such as the piston displacement.

It should be noted here that the use of long intake pipes, per se, of empirical length, for improving the volumetric efficiency of four-stroke internal combustion engines is known in the prior art, as exemplified in a paper published by E. S. Dennison, entitled "Inertia Supercharging of Engine Cylinders," Proceedings of the Sixth Oil Power Conference, at the Pennsylvania State College, June 8–11, 1932, wherein it is recognized that such an intake pipe has utility as a storage device for kinetic energy of inducted air. Such prior art, however, has been concerned neither with engines embodying high air swirl rates, nor with engines operating at high speeds with the non-knocking type of combustion as taught in the above cited Barber patent.

In the conventional four-stroke internal combustion engine, the piston motion accelerates from zero velocity at its top dead center position to a maximum velocity at about mid-stroke position and then decelerates to zero velocity at bottom dead center, with the inlet valve opening at about top dead center and remaining open until after bottom dead center.

Corresponding to the downward displacement of the piston, but lagging behind it slightly in time, air motion through the intake pipe is accelerated until a maximum velocity is reached shortly after the piston has reached its maximum velocity.

Thereafter, as the piston decelerates, the inertia of the column of air in the intake pipe causes the air to tend to maintain its established velocity. The continuing inertia flow can be utilized to produce a supercharging effect in the engine cylinder.

This supercharging effect exists in almost any shape and size of engine intake system. The effect becomes important for certain definite proportions of length and diameter of intake pipe. Factors involved in the choice of a length and diameter of an intake pipe are:

(1) The volume of the intake pipe in relation to the piston displacement, and (2) The nominal velocity of flow through the intake pipe.

On the one hand, it is desirable to have a sufficient volume of the intake pipe to contain an appreciable fraction of a cylinder charge and to have this pipe small in diameter so that the air moves with high velocity, thereby creating a large inertia effect. On the other hand, a long pipe with a small diameter gives rise to appreciable frictional resistance which opposes the inertia effect. Therefore, a compromise between these opposing factors must be effected to achieve a significant increase in volumetric efficiency by inertia supercharge.

There is no "optimum" condition for choice of pipe size. With a given pipe diameter, increases in pipe length will cause higher and higher values of volumetric efficiency to occur at lower and lower R. P. M., while at higher R. P. M., the values of the volumetric efficiency will be below those for shorter pipes. This phenomenon is illustrated in Fig. 3, which shows values of volumetric efficiency ($e_v$) plotted against speed (R. P. M.) for a 3½" x 3¾" cylinder, with the use of a 1¼" diameter of intake pipes of varying lengths. The maximum $e_v$ point on each curve represents the balance point at which frictional resistance begins to overcome the inertia effect. Obviously, the result is specific to the particular details of the test, e. g., since the frictional resistance depends on the smoothness of the pipe, the resulting curves of Fig. 3 will vary with such factors as the pipe selected to form the intake system.

Fig. 4 illustrates the values of volumetric efficiency obtained by the use of an intake pipe of relatively larger diameter and with varying lengths, on the same engine from which the curves for Fig. 3 were obtained. The maximum values of $e_v$ are noticeably less than those of the curves of Fig. 3 for coresponding lengths, demonstrating lesser inertia supercharge when large diameter intake pipes are used. Also, even with increased pipe lengths, there is no contrast in the efficiencies obtained for the lower and higher values of R. P. M. as in the case of the use of the smaller intake pipe diameter of Fig. 3.

Fig. 5 shows the efficiency curve for a compromise solution for an intake pipe for use on the engine of Figs. 3 and 4 with a fuel-air ratio of 0.06 and swirl ratio of 4.4, the length of intake pipe being 18" and the inside diameter 1⅜".

Operation of the engine with the improved air intake system may be described as follows: when the inlet valve 19 opens at or near the top dead center position of the piston, the ensuing suction stroke of the piston starts the flow of air in the intake pipe 33 through the inlet port 17 and the orifice area, opened by valve 19, into the cylinder, and the pressure in the intake pipe 33 near the inlet port 17 begins to fall. Through the deflecting action of the shroud 31 carried by the inlet valve 19, the incoming air is directed tangentially of the combustion chamber 25, and after admission into the combustion chamber, is deflected further by the cylindrical wall thereof to produce a high speed swirling movement or rotation of the air charge about the axis of the cylinder. As long as a pressure differential exists between the ends of the intake pipe with the higher pressure at the open end thereof, the air column in the intake pipe 33 will be accelerated toward the cylinder, and thereby will gain in kinetic energy in direct proportion to the mass of the air in the pipe and in inverse proportion to pipe friction. As the air pressure within the cylinder rises during the compression stroke of the piston, and as the inlet valve begins its closing, the flow of the air column from the intake pipe 33 into the cylinder tends to be impeded by these two factors. The above mentioned kinetic energy in the air column causes a ram pressure to be built up at the inlet port, from which, in accordance with the present invention, maximum benefit is derived in the form of an increase in compression pressure in the cylinder.

The air column in pipe 33 is not in a state of equilibrium at the end of the intake process, and therefore vibrates in the intake pipe to produce standing waves therein. Such standing waves, however, are of relatively small amplitude compared to the above described transient effect, which is developed during each suction stroke of the piston, and upon which the present invention relies. These standing waves are gradually attenuated due to friction losses, and some losses to the atmosphere at the open end of the pipe, during the time the inlet valve is closed.

The important effect of the improved air intake system therefore is a dynamic transient one, consisting of a first phase, in which the air column in the intake pipe 33 is accelerated toward the cylinder, while the air entering the cylinder through the reduced capacity orifice resulting from the shroud on the valve 19 acquires the velocity necessary to produce the desired high velocity swirl, and a second phase, in which, after the kinetic energy of the air column has been built up to a high level before the closing of inlet valve 19, the resistance to the motion of the air column, caused by the closing of the inlet valve together with the pressure buildup within the cylinder, converts the kinetic energy of the inducted air to ram pressure build-up at the inlet port, with resultant increased compression pressure in the cylinder preventing loss of volumetic efficiency, and even resulting in a gain therein.

After the inlet valve 19 is closed, no further air charge is drawn into the cylinder; and during the remaining portion of the compression stroke, the piston compresses the air within the combustion chamber, and combustion occurs in the manner heretofore described.

Thus it can be seen that in an internal combustion engine operating at high speed and with a relatively high air swirl rate, the objects of invention are attained by simple and inexpensive means resulting in a practical solution to the problem of attaining improved volumetric efficiency.

Obviously, many modifications and variation of the invention as hereinbefore set forth, may be made without departing from the spirit and scope thereof, and therefore only such limitations may be imposed as are indicated in the appended claims.

I claim:

1. An air intake system for a high-speed internal combustion engine of the reciprocating piston type operating with swirling of the intake air charge about the combustion chamber at about six revolutions per crank shaft revolution comprising a cylinder having an air inlet port therein, a poppet inlet valve at one end of said port for control of air flow therethrough, a shroud on said inlet valve for deflecting incoming air tangentially of the combusion chamber to provide an induction air flow therein, an air intake pipe having an interior smooth wall surface connected to the inlet of said port, said intake pipe having a length of 18 inches and a diameter of 1⅜ inches where said engine has a piston displacement corresponding to a 3½" piston and a 3¾" stroke and operates at a fuel to air ratio of 0.06 and an air swirl of 4.4, engine timed means for opening said valve substantially coincident with the beginning of the suction stroke of the piston to induct air into said combustion chamber through said intake pipe and inlet port and for effectively closing said valve to substantially terminate air induction shortly after bottom dead center position of said piston, the cross section area at the valve seat at maximum opening of said valve being less than that of said intake pipe and said inlet port.

2. An internal combustion engine comprising a cylinder having a reciprocating piston therein, means for injecting fuel into a localized segment of said cylinder, means for positively igniting the first increment of injected fuel substantially as soon as combustible mixture is formed therefrom to establish a flame front, means for inducting an air charge into said cylinder so as to cause it to rotate through said flame front in synchronization with the injection of fuel to form successive increments of fuel-air mixture for progressively burning at said flame front substantially as rapidly as formed, the air charge inducting means comprising an inlet port in said cylinder and an open-end intake pipe having a smooth interior surface connected to said inlet port at the upstream end thereof, said pipe having a length and a diameter determined by the bore and stroke of said piston, valve means for said inlet port, means for abruptly opening said valve means to establish communication between the inner end of said pipe with the engine cylinder during the intake stroke of said piston when the pressure within the engine cylinder is subambient to produce a transient rarefaction within said intake pipe, air deflecting means associated with said valve means for directing air flowing through said inlet port tangentially of said cylinder, and means for closing said valve means shortly after piston bottom dead center position to develop from the compressional wave resulting from said rarefaction a transient superambient air pressure in said cylinder, the area of the cross section at the seat of said valve means at maximum opening thereof being less than that of said pipe cross section and of said inlet valve, said length of said pipe being 18" and the diameter thereof being 1⅜", when said piston bore and stroke are equal respectively to 3½" x 3¾" and when said engine is operating with an air swirl ratio of 4.4 and a fuel-air ratio of 0.06.

3. In an internal combustion engine, a power cylinder with a piston operating therein providing a disc-shaped combustion chamber, means for introducing air into said combustion chamber and for imparting a high velocity swirl thereto, injection means carried by said cylinder for injecting fuel into said combustion chamber so that an increment of injected fuel forms with a localized portion of swirling air therein a combustible fuel-air mixture adjacent said injection means, said last mentioned means being positioned to inject fuel in a tangential direction into said combustion chamber and in the direction of air swirl, a spark ignition device mounted on said cylinder having its electrodes positioned adjacent the cylinder wall within said combustion chamber downstream of said injection means so that said combustible fuel-air mixture resulting from said increment of injected fuel contacts said electrodes substantially as soon as said combustible mixture is formed to initiate combustion and to establish a flame front, the central angle at the cylinder between the radii through the center lines of said injection means and said ignition device being less than 120° and means for impregnating shortly in advance of said flame front additional quantities of the swirling air to form progressively additional combustible fuel-air mixture for burning substantially as rapidly as formed whereby the formation of sufficient end gases consisting of combustible fuel air mixture trapped by said flame front to cause spontaneous ignition and produce knock is prevented, said means for introducing air comprising an inlet port and a relatively smooth open-end intake pipe joined thereto and having a length and cross-sectional area such that the volume of said intake pipe bears a definite relationship to the piston displacement in said cylinder whereby the air introduced into said combustion chamber through said intake pipe is subjected to inertia supercharge of dynamic transient nature, and a shrouded valve for control of air flow through said port, the minimum cross sectional area of said port and said pipe being at the seat of said shrouded valve at maximum opening thereof, said length of said pipe being 18" and the diameter thereof being 1⅜", when said piston bore and stroke are equal respectively to 3½" x 3¾" and when said engine is operating with an air swirl ratio of 4.4 and a fuel-air ratio of 0.06.

4. In a four-stroke internal combustion engine having a power cylinder with a piston operating therein providing a disc-shaped combustion chamber, an intake port for said cylinder, a shrouded intake valve controlling said port, said intake port and valve being constructed to provide an induction air swirl within said cylinder on the suction stroke of said piston, injection means carried by said cylinder for injecting fuel into a localized portion of the compressed swirling air within said combustion chamber, a spark ignition device mounted on said cylinder having electrodes positioned downstream of said injection means such that the central angle at the cylinder axis between the radii passing through the center lines of said injection means and said ignition device is less than 45°, whereby the first increment of injected fuel forms a localized segment of combustible fuel-air mixture which is ignited by said ignition device substantially as soon as formed to establish a flame front, and means for impregnating immediately in advance of said flame front additional increments of the swirling compressed air to form progressively additional combustible fuel-air mixture which is ignited at said flame front and burned substantially as rapidly as formed, the improvement which comprises an intake pipe connected to said intake port, said intake pipe having a smooth wall interior surface providing an unobstructed passage of circular cross-section having a diameter within the range of 1¼ inches to 1½ inches, and having an outer end opening freely to the atmosphere, with the length of said pipe and unobstructed passage within the range of 18 inches to 30 inches, the minimum cross-sectional area of said passage and inlet port being at the seat of said shrouded valve at maximum opening of said valve, the volume of said intake pipe being correlated with the piston displacement to provide a high velocity of air flow through said pipe during each suction stroke of said piston wherein the air column in said intake pipe is first accelerated toward the cylinder and the resultant kinetic energy of said air column then produces a dynamic transient ram pressure build-up at said inlet port as said valve is closing whereby said intake pipe, inlet port and valve provide both an inertia supercharging effect and a high air swirl rate within said cylinder of at least 4.4 rotations per engine revolution.

References Cited in the file of this patent
UNITED STATES PATENTS

| 1,802,848 | Summers | Apr. 28, 1931 |
| 2,484,009 | Barber | Oct. 11, 1949 |

OTHER REFERENCES

"Inertia Supercharging of Engine Cylinders," by Dennison, ASME Trans. OGP 55 (1933).

"Dynamics of the Inlet System of a Four-Stroke Engine," NACA Tech. Note 935 (1944).

"Internal Combustion Engines," by Lichty, pp. 283, 284, McGraw-Hill Book Co., New York 1951, 6th ed.